United States Patent [19]

Murakami

[11] 4,092,873
[45] June 6, 1978

[54] CONVERTING CONTINUOUS ROTARY MOTION

[75] Inventor: Saburo Murakami, Sakai, Japan

[73] Assignee: Wataru Shimokawa, Japan

[21] Appl. No.: 635,209

[22] Filed: Nov. 25, 1975

[30] Foreign Application Priority Data

Nov. 29, 1974 Japan .................................. 49-136319
Oct. 21, 1975 Japan .................................. 50-125843

[51] Int. Cl.² ............................................ F16H 27/04
[52] U.S. Cl. .......................................................... 74/82
[58] Field of Search ...................................... 74/54, 82

[56] References Cited

U.S. PATENT DOCUMENTS

| 678,409 | 7/1901 | Lengweiler | 74/54 |
|---|---|---|---|
| 804,201 | 11/1905 | Blake | 74/54 |
| 1,411,855 | 4/1922 | Loeb | 74/54 |
| 1,996,675 | 4/1935 | Hagan | 74/54 |
| 2,095,744 | 10/1937 | Hanna | 74/54 |
| 3,026,832 | 3/1962 | Taketomi | 74/54 |

FOREIGN PATENT DOCUMENTS 713,010  10/1941  Germany .................................. 74/54

Primary Examiner—Samuel Scott
Assistant Examiner—Wesley S. Ratliff, Jr.
Attorney, Agent, or Firm—William A. Drucker

[57] ABSTRACT

In the apparatus for creating a swinging motion, one ends of two opposed sides of a flexible link are secured to a stationary member and the opposite ends of the sides are connected to a driven shaft. A cam member is slidably mounted on a drive shaft and arranged between the two sides so as to continuously engage them when the cam member is rotated by the drive shaft. The cam has gradually varying configuration and when it is shifted along the drive shaft, the swinging angle is varied. By suitably constructing the cam member it is possible to stop the swinging motion and reverse the phase thereof.

10 Claims, 12 Drawing Figures

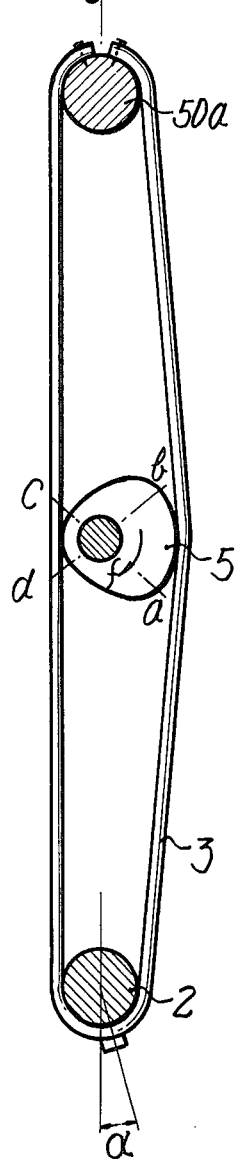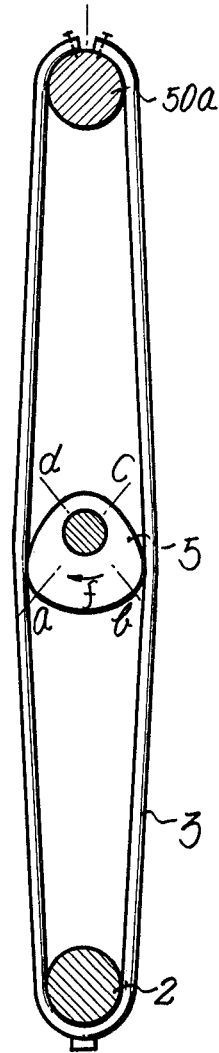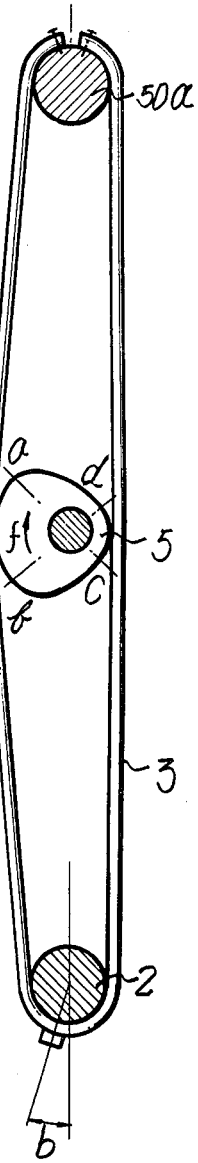

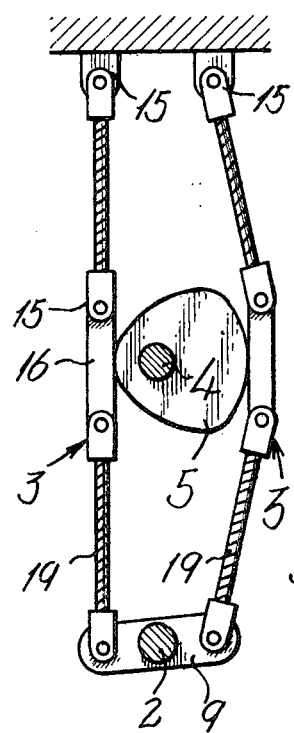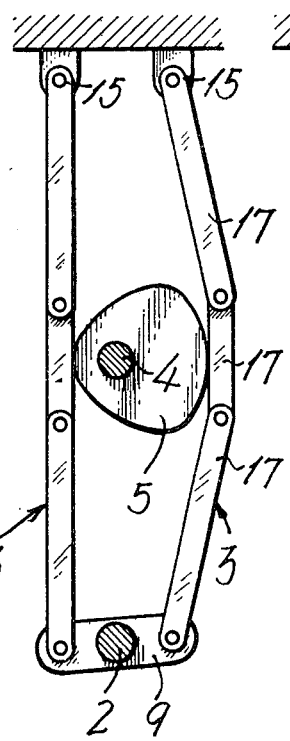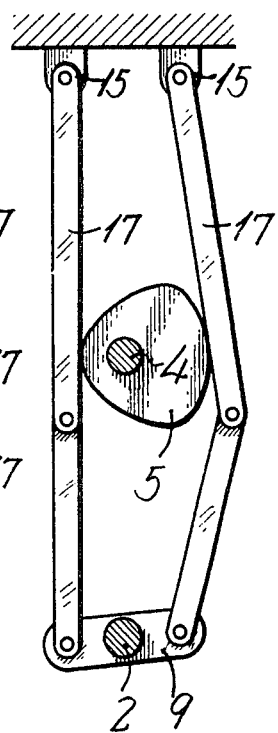

CONVERTING CONTINUOUS ROTARY MOTION

BACKGROUND OF THE INVENTION

This invention relates to apparatus for generating a swinging motion capable of adjusting the swinging angle, and, if desired, capable of reversing the phase and stopping the swinging motion temporally.

Although many types of mechanisms have been proposed for converting a rotary motion into a swinging motion typical mechanisms include a mechanism utilizing a four member link and a mechanism utilizing a cam. The former is utilized for performing simple but accurate operations and the latter for performing complicated motions. In the cam drive mechanism, usually the motion of the follower member in one direction is effected by the surface of the cam while the motion of the follower member in the opposite direction is effected by urging the follower member against the cam surface by utilizing the weight of the follower member or a spring. However, in a high speed operation it is difficult to cause the follower member to precisely follow the cam surface so that where correct motions are required double contacts are used to restrain the movement of the follower member in two directions. This mechanism too includes a member of types. According to one type a roller is fitted in a cam groove while according to the other type a cam is located between two parallel planes. According to a typical construction of the latter type an eccentric disc is fitted between two parallel planes of a bifurcated rod so as to produce a reciprocating motion by the rotation of the eccentric disc. Where it is desired to temporally stop the reciprocating motion a triangular cam is used instead of the eccentric disc. Where an eccentric disc or a triangular cam is fitted between two flat surfaces of a bifurcated rod inaccurate fit or coarse finishing of the surfaces results in an inaccurate motion and noise so that it is necessary to accurately finish these members. Further, in the four member link mechanism it is impossible to change the length of the link during operation so that it is difficult to adjust the swingle angle of the follower link. Also in the mechanism of creating a swinging motion by utilizing a combination of a bifurcated rod and a cam it is impossible to adjust the eccentricity of the cam during operation. Accordingly, it is necessary to use an independent mechanism in order to adjust the swinging angle and the phase during operation thus requiring a complicated mechanism which is not only expensive but also accompanies fault and noise. Moreover, the curve along which the swinging motion occurs is limited by the length of the links in the four member link mechanism or by the eccentricity of the cam in the mechanism utilizing a bifurcated rod and a cam so that it is impossible to obtain a desired swinging curve. Further, the links or bifurcated rod utilized to transmit the motion are required to have a large mechanical strength to withstand tension, compression or bending force acting thereon. Accordingly, they are heavy and cause vibration.

SUMMARY OF THE INVENTION

Accordingly it is an object of this invention to provide an improved apparatus for generating a swinging motion capable of eliminating these defects of the prior art.

Another object of this invention is to provide an improved apparatus for generating a swinging motion which is not required to be finished precisely, can adjust the swinging angle and subjected to tension alone and hence has light weight.

Still another object of this invention is to provide an improved apparatus for generating a swinging motion which does not produce noise and can produce any desired curve of motion.

According to this invention these and further objects can be accomplished by providing apparatus for converting a continuous rotary motion of a drive shaft into a swinging motion of a driven shaft, characterized in that one ends of two opposed sides of a flexible link are secured to a stationary member, the opposite ends of the sides are connected to the driven shaft, a cam member is slidably mounted on the drive shaft and arranged between the two sides so as to continuously engage them when the cam member is rotated by the drive shaft, the cam has gradually varying cross-sectional configuration, means is provided for axially shifting the cam member along the drive shaft for varying the swinging angle of the driven shaft.

With this construction, the flexible link is never subjected to compression but only to tension so that it is possible to construct it to have light weight and is not necessary to be finished precisely.

The cam member takes the form of a cylinder having circular cross-sectional configuration at the axial center thereof and substantially triangular cross-sectional configuration with rounded corners on both sides of the axial center. The cam member has opposed round surfaces. The radius of one round surface decreases and that of the other round surface increases from the axial center toward the both ends whereby when the cam member is shifted axially, the swinging angle of the driven shaft is varied gradually, and the swinging motion is stopped when the flexible link engages the cam member at its axial center. The phase of the swinging motion is reversed between the opposite ends of the cam member.

BRIEF DESCRIPTION OF THE DRAWING

Further object and advantages of the invention can be more fully understood from the following detailed description taken in conjunction with the accompanying drawings in which:

FIGS. 3A, 3B and 3C are diagrams useful to explain the operation of the embodiment of this invention;

FIGS. 6 through 10 are side views showing modified embodiments of this invention.

DESCRIPTION OF THE PREFERRED EMBODIMENTS

Figure 1:
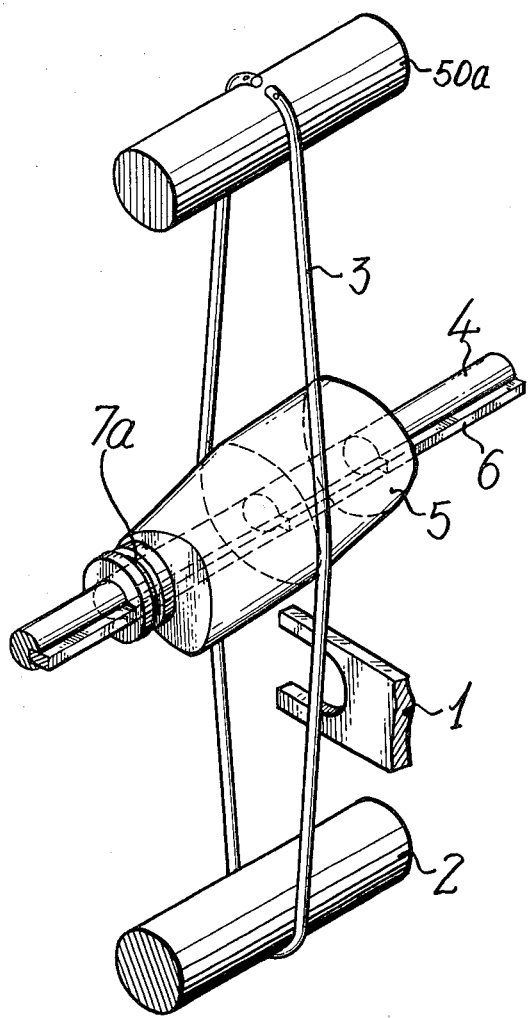
FIG. 1 is a perspective view showing one embodiment of this invention.

A preferred embodiment of this invention shown in FIG. 1 comprises a stationary shaft 50a supported by a machine frame, not shown, a flexible motion transmitting link 3 in the form of a loop with its upper ends secured to the shaft 50a and its intermediate point or lower end connected to a driven shaft 2. The flexible link 3 is made of a material which does not elongate or contract such as a belt, chain or cord. The upper ends of the link are secured to the stationary shaft either directly or through pivot pins. So long as the relative position in the circumferention direction between the flexible link and the driven shaft does not change, the flexible link may be connected to the driven shaft by various means, that is either directly or through a link or pulley secured to the driven shaft, or a sprocket wheel when the link comprises a chain. At an intermediate point of the link 3 is positioned a cam member 5 which is connected to a drive shaft 4 rotating continuously in one direction through a key 6 or a spline or pin to be slidable in the axial direction. An operating member 7 provided with a circumferential groove 7a is integrally formed on one end of the cam member 5. As will be described later in more detail with reference to FIG. 5 an arcuate member of an actuator 1 is received in the groove 7a for shifting the cam member 5 in the axial direction thereby changing the contact position between the flexible link 3 and the cam member 5.

Figure 2:
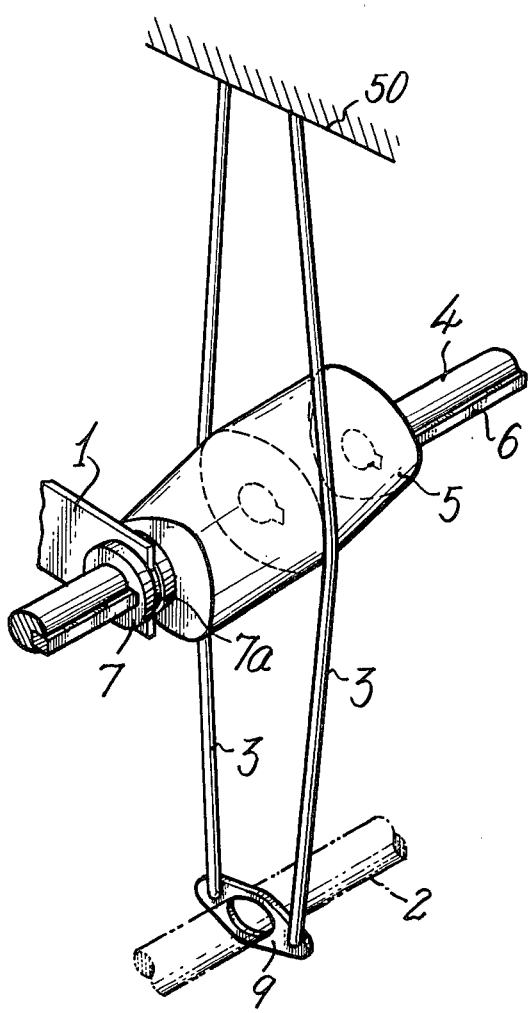
FIG. 2 is a perspective view showing a modified embodiment of this invention.

FIG. 2 shows an modified embodiment of this invention utilizing two flexible links 3. The upper ends of the flexible links are secured to a stationary member 50 such as a machine frame, whereas the lower ends are connected to the opposite ends of a link 9 secured to the driven shaft 2. The cam member 5, drive shaft 4 and the actuator 1 of the cam member 5 are identical to those shown in FIG. 1. Accordingly, the operation of this embodiment is similar to that of the first embodiment. Where a link 9 is secured to the driven shaft 2, it may have a relatively small diameter.

The operation of the mechanism shown in FIGS. 1 and 2 will be described with reference to FIGS. 3A, 3B and 3C. As the drive shaft 4 is rotated continuously in one direction by means of an electric motor for example, not shown, cam member 5 is also driven continuously to drive the flexible link 3. The cam member 5 in this example is constructed to momentarilly stop at the upper dead center or the lower dead center. More particularly, the radius of the cam member is the largest in a range of from $a$ to $b$ but the smallest in the range of from $c$ to $d$. In the ranges $a - b$ and $c - d$ the radius is constant. The ranges $a - b$ and $c - d$ are interconnected by regions $b - c$ and $d - a$ having gradually varying radii. The cam surfaces displacing laterally the flexible link are constructed to have suitable radii to give a predetermined displacement to the flexible link for a swinging angle of 180°, and radii for the remaining swingle angle of 180° to displace the flexible link 5 without any slack. In other words, the flexible link 3 does not slack at any rotational position of the cam member 5.

In FIGS. 3A, 3B and 3C it is assumed that the cam member 5 rotates in the clockwise direction. In the position shown in FIG. 3A, the righthand side of the flexible link 3 engages the cam surface $a - b$ having larger radius whereas the lefthand side of the flexible link 3 engages the cam surface $c - d$ having smaller radius with the result that the righthand side is subjected to a maximum displaced and the lefthand side to a minimum displacement. Consequently the driven shaft 2 is swung in the counterclockwise direction by the maximum angle $\alpha$. Under these conditions, since the left and right and sides of the flexible link 3 are engaging the midpoints of the cam surfaces $a - b$ and $c - d$ each having a constant radius, even when the cam member 5 rotates a little in either direction, the driven shaft 2 would not be rotated. As the cam member 5 rotates further, the righthand side will come to engage cam surface $b - c$ having gradually decreasing radius and the lefthand side will come to engage cam surface $d - a$ having gradually increasing radius 60 that the displacement of the righthand side decreases whereas that of the lefthand side increases. Accordingly, the driven shaft 2 is rotated in the clockwise direction until a neutral point shown in FIG. 3B is reached at which the displacements of the left and righthand sides of the flexible link 3 are equal. As the cam member rotates further the displacement of the righthand side engaging the cam surface decreases gradually until a minimum displacement is reached at point $c$. On the other hand the displacement of the lefthand side engaging the cam surface $d - a$ increases gradually until a maximum displacement is reached at point $a$. Accordingly, the driven shaft 2 is rotated in the clockwise direction until a maximum swinging angle is reached. As the cam member 5 rotates further in the clockwise direction since the left and righthand sides of the flexible link engage cam surfaces $a - b$ and $c - d$, respectively, of constant radii, the driven shaft 2 will not be rotated. FIG. 3C shows the relative positions of various elements when the cam member 5 is rotated 180° from the position shown in FIG. A. When the cam member is rotated further, the left and righthand sides of the flexible link come into engagement with cam surfaces $b - c$ and $d - a$ respectively so that the driven shaft will be rotated in the counterclockwise direction. In this manner, by the continuous rotation of the cam member 5 the driven shaft 2 will swing or oscillate about its axis.

Figure 4:
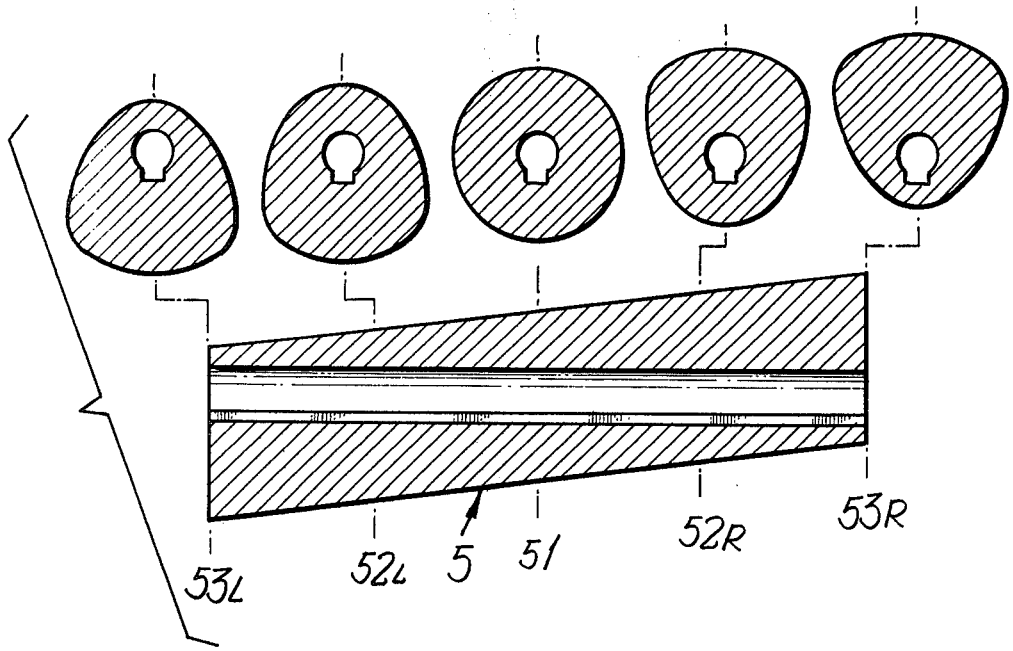
FIG. 4 shows a longitudinal sectional view of the cam utilized in the embodiment shown in FIG. 1 and cross-sectional views at various portions thereof.

While FIGS. 3A, 3B and 3C show a cross-sectional configuration of the cam member at one point along the length thereof, the cam member is generally cylindrical but its cross-sectional configuration varies along the length thereof as shown in FIG. 4. As shown by sectional views at five spaced points shown in FIG. 4, the sectional configuration is generally triangular with round corners but varies gradually along the length. More particularly, the cross-section at the axial center 51 is circular. The vertical radius on the upper side increases gradually from the lefthand side 53L to the righthand side 53R whereas the vertical radius on the lower side decreases gradually from the lefthand side to the righthand side. The differences in the vertical radii on the upper and lower sides are the maximum on both ends, but displaced 180°. Since the cross-sectional configuration of the cam member is so determined that both sides of the flexible link engage the diametrically opposite points with minimum slack so that when the left and righthand sides of the flexible link engage the axial center of the cam member the displacements of the left and righthand sides of the flexible link are equal whereby the driven shaft is maintained at the neutral point without swinging. As the contact points between the flexible link and the cam member are moved to the left or right from the axial center, the difference in the radii increases with the result that the difference in the displacements of the left and righthand sides of the flexible link increase also. Accordingly, the maximum angle of swinging of the driven shaft also increases. At both ends 53L and 53R where the differences in the radii at the contact points are the maximum, the angle of swinging of the driven shaft reaches the maximum. However, as there is a 180° phase difference between the lefthand and righthand ends, the driven shaft swings for the same angle but in opposite phase. With the cam member 5 constructed as above described it is possible to vary the swinging angle and reverse the phase of the driven shaft.

As can be noted from the foregoing description, where it is not desired to vary the swingle angle, the cam member may have a single cross-sectional configuration. Further, where it is not necessary to provide a neutral point where the driven shaft is not moved, it is not necessary to form a portion having equal radius. Moreover, where it is desired to vary only the angle of swinging and not necessary to reverse the phase, only the portions to the left or right of the central section 51 are suffice.

Figure 5:
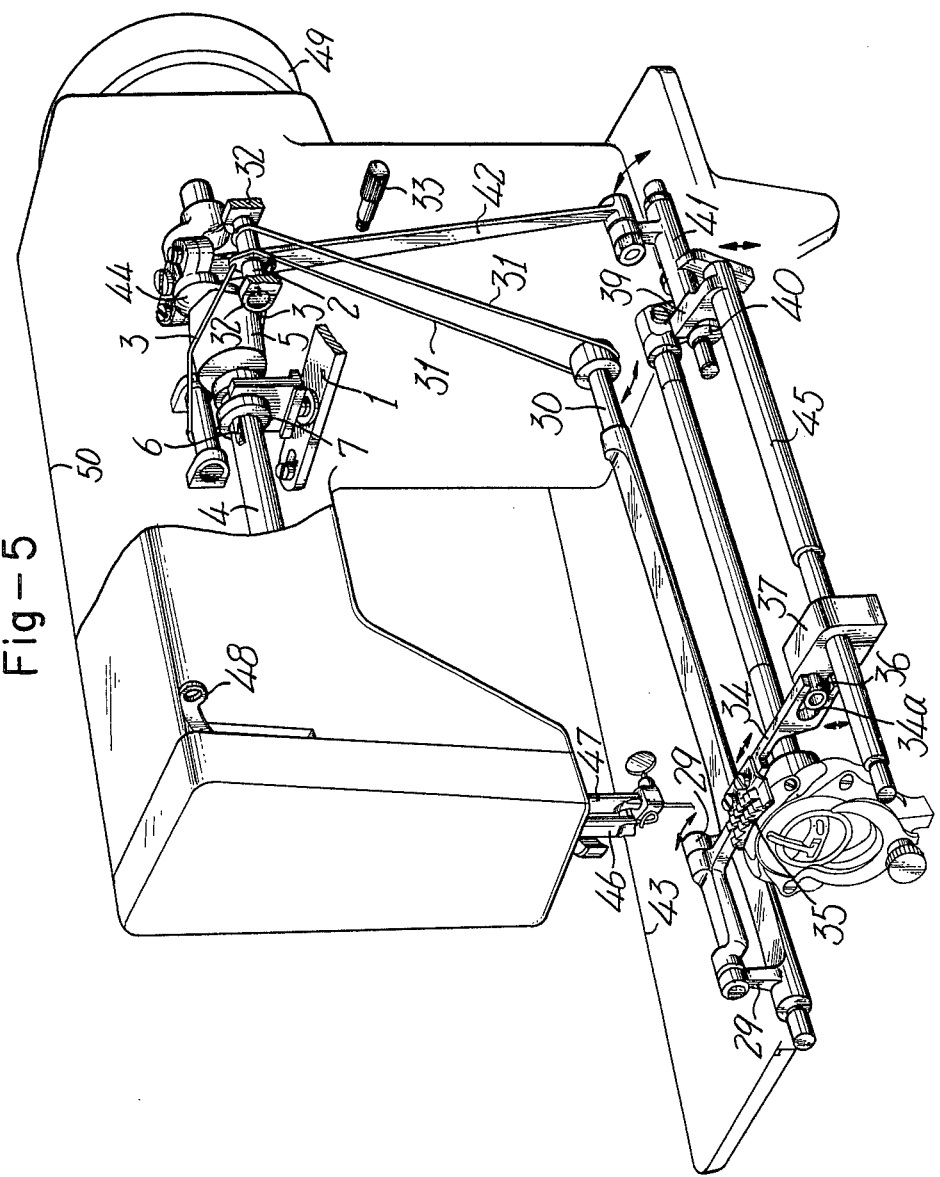
FIG. 5 is a perspective view, partly in section, of a sewing machine utilizing the mechanism of this invention.

FIG. 5 shows an application of this invention to a cloth feeding mechanism of a sewing machine. The drive shaft 4 is mounted in the upper arm 50 and driven by an electric motor or the like driving means, not shown, through a pulley 49. The swinging beam 48 and the needle rod 47 are reciprocated in the vertical direction by well known crank mechanisms (not shown) mounted on the lefthand end of the drive shaft 4. A clamping member, not shown, is mounted on the lower end of a rod 46 to clamp the cloth in position during which the cloth is sewed by the vertical reciprocating motion of needle, not shown, mounted on the lower end of the needle rod. A crank 44 is mounted near the righthand end of the drive shaft 4 for swinging a first pivot shaft 41 located beneath a bed 43 in parallel with the drive shaft 4 through a link 42. A triangular cam 40 on one end of the pivot shaft 41 is received in the bifurcated arm 39 secured to the righthand end of a shaft 45. A roller 36 carried by an arm 37 secured to the opposite end of the shaft 45 is received in the bifurcated end 34a of a support 34 extending beneath the bed at right angles with respect to the shaft 45 and carrying cloth feeding teeth 35. With this contruction, as the drive shaft 4 rotates, the support 34 is imparted with a vertical reciprocating motion including upper and lower dead centers where the movement is stopped instantaneously.

The mechanism of this invention is used to impart a horizontal cloth feeding movement to the support 34 of the cloth feeding teeth 35. More particularly, the cam member 5 is mounted on the drive shaft 4 to be slidable in the axial direction in a manner described above, such axial movement being accomplished by the actuating member 1 operated by a knob 33 disposed on the outside of the machine frame 50. In this case, the flexible link 3 is located horizontally with its one end connected to a link 9 secured to the driven shaft 2 rotatably supported by supports 32 secured to the machine frame. The cam member 5 has the same construction as that shown in FIG. 4 so that it is possible to vary the angle and phase of swinging motion of the driven shaft 2 and to stop the same at the upper and lower dead centers. The swinging motion of the driven shaft 2 thus imparted is transmitted through a belt 31 to a shaft 3 extending beneath the bed in parallel with the drive shaft 4. Two spaced arms 29 are secured to the lefthand end of shaft 30 to support the base portion of the support 34 therebetween. Thus, the swinging motion of shaft 30 produces a horizontal reciprocating motion to the support 34 which is combined with the vertical reciprocating motion imparted by shaft 45 to impart substantially parallelogrammic motion to the teeth 35. In other words, the teeth 35 are moved forewardly in the horizontal direction while they are raised, lowered and then moved backwardly. By repeating this cycle of motion the cloth is fed. Adjustment of the swinging angle of the driven shaft permits adjustment of the feed whereas reversal of the phase permits reversal of the direction of feed of the cloth. Further, the temporary stop of the swinging motion assures commencement of the horizontal movement of the teeth only after they have been raised thus providing correct feeding of the cloth irrespective of the thickness thereof.

In addition to the horizontal cloth feeding mechanism of a sewing machine described above, the mechanism of this invention is also applicable to any application where a swinging motion is desired in which adjustment of the swinging angle and the phase, as well as temporal stops during operation are desired.

Further, the mechanism can also be used to impart swinging motions to the needle rod or bobbin carrying shuttle of a zig-zag sewing machine in which adjustment of the swinging angle and temporal stop are also desired. When applied to the cloth feeding mechanism the mechanism of this invention can be constructed to move the feed teeth 35 to move in both horizontal and vertical directions and to temporally stop the teeth. The mechanism of this invention is also applicable to a drilling machine, rivetting machine, spot welder, shear or the like.

Figure 6:
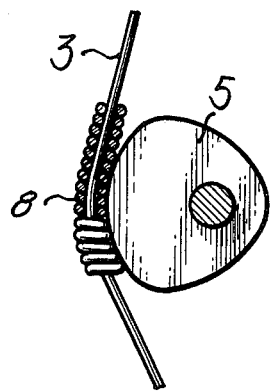
Figure 7:
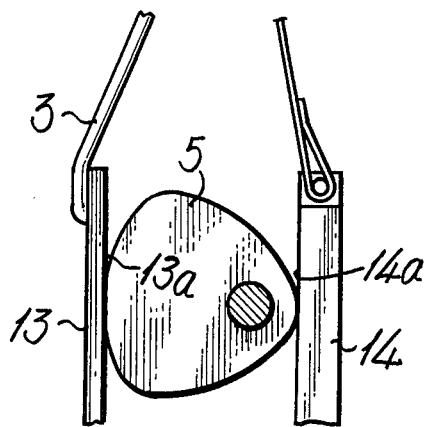

The flexible link 3 is not required to be flexible throughout its length. For example, as shown in FIG. 6, the portion of the link engaging the cam member 5 may be covered by a coil spring 8 for improving durability. When worn out the coil spring can readily be exchanged with a new one. The coil spring 8 also improves contact against cam member 5. In order to further improve the durability of the flexible link 3, the portions thereof engaging the cam member 5 can be made of steel plate or metal plate 13 and 14 as shown in FIG. 3 to cause them to engage flatwisely (13a) or edgewisely (14a). When engaged flatwisely, the contact against the cam member is improved whereas when engaged edgewisely it is possible to improve the durability of the flexible link.

Further, as shown in FIGS. 8, 9 and 10, it is possible to secure the upper ends of the flexible links 3 to a stationary member by means of crevice joints 15. In the example shown in FIG. 8, the intermediate portions of the flexible links 3 that engage the cam member 5 are made of rigid links 16. In the example shown in FIG. 9 three rigid links 17 are pivotally connected together to form flexible links, whereas in the example shown in FIG. 10, two rigid links 17 are pivotally connected together. By increasing the number of links 17 it is possible to obtain a chain. Such modified flexible links have improved wear resistant property and can reduce contact friction. Where a chain is used a sproket wheel can be mounted on the driven shaft. Where a pulley or cylinder is substituted for the lever 9 secured to the driven shaft 2, it is possible to pass a single flexible link about the pulley or cylinder and to secure the central portion of the flexible link to it. Alternatively, where two flexible links are used it is possible to wrap their one ends about the pulley or cylinder in the opposite directions. In this case, where the ends of the flexible links are secured to the opposite sides on both side of a plane passing through the axes of the drive shaft 4 and driven shaft 2 at the same distance from that plane, it is possible to eliminate the slack of the flexible links irrespective of the phase of the cam member 5, thus providing a swinging motion without any backlash. Where a link 9 is used for connecting the flexible links to the driven shaft 2, it is also possible to eliminate the slack of the flexible links by suitably selecting the maximum swinging angle and the distance between the drive shaft and the points at which the flexible links are connected to the driven shaft 2. Where it is desired to change the neutral point of the driven shaft 2, one or other of the points of connection between the flexible links and the driven shaft is moved along the periphery thereof.

As above described the invention provides an improved apparatus for creating a swinging motion capable of changing the angle and phase of swinging, can produce any desired speed curve and can stop the driven shaft. Moreover, as the flexible link comprises a belt, cord or chain or combinations thereof with rigid links, or interconnected links, it is not necessary to precisely finish them, thus eliminating backlash, vibration and wear. Further, the flexible link is subjected to only tension, it is possible to make it light weight.

What is claimed is:

1. Apparatus for converting a continuous rotary motion of a drive shaft into a rocking motion of a driven shaft, comprising:
   (i) a drive shaft
   (ii) a profile cam member mounted on said drive shaft for rotation therewith, said cam member being axially slidable on said drive shaft, said cam member being circular at its axial center, said cam member having at each side of said axial center respective portions which have contours with a substantially triangular cross-section with rounded corners, each such portion of said cam member having opposed arcuate surfaces, the radius of one such opposed surface decreasing and the radius of the other of such opposed surfaces increasing considered in the direction from said axial center towards the other end of each portion,
   (iii) a driven shaft having its axis of rotation parallel to the axis of rotation of the drive shaft
   (iv) a structural member mounted in fixed spaced relationship with respect to the axes of the drive shaft and driven shaft
   (v) a cam follower comprising a pair of inextensible strands secured at a first end to said structural member and coupled at their second end to the driven shaft at a radial spacing from said driven shaft, said strands lying in a plane normal to the axis of the cam member, said strands being respectively in continuous abutment each with a diametrically opposed portion of the cam surface,
   whereby as said cam member rotates and causes radial movements of said strands the driven shaft is caused to rock about its axis, the rocking motion being variable by axial shifting of the cam member to bring different contours of the cam member into abutment with the strands.

2. Apparatus, as claimed in claim 1, wherein the respective contours of said cam portions at each side of said center are 180° phase displaced one with respect to the other.

3. The apparatus according to claim 1 wherein said flexible strands comprises a continuous elongated member with both ends secured to said stationary member and the central portion looped about said driven shaft and secured thereto.

4. The apparatus according to claim 1 wherein said flexible strands comprise two separate substantially parallel members secured at one of their ends to said stationary member and at the other of their ends to said driven shaft.

5. The apparatus according to claim 4 wherein said opposite ends of said members are connected to said driven shaft on the opposite sides thereof such that said opposite ends surround the periphery of said driven shaft in an overlapping relationship.

6. The apparatus according to claim 4 wherein said opposite ends of said members are connected to the opposite ends of a transversely extending link secured to said driven shaft.

7. The apparatus according to claim 1 wherein the portions of said flexible strands engaging said cam members are covered by coil springs.

8. The apparatus according to claim 1 wherein the portions of said flexible strands engaging said cam member are made of metal strips.

9. The apparatus according to claim 1 wherein said flexible strands comprise a plurality of pivotally connected rigid links.

10. The apparatus according to claim 1 wherein said flexible strands comprise a cord, chain or belt.

* * * * *